United States Patent [19]
Kiuchi

[11] Patent Number: 4,692,014
[45] Date of Patent: Sep. 8, 1987

[54] DISPLAY DEVICE FOR CAMERA

[75] Inventor: Masayoshi Kiuchi, Kanagawa, Japan

[73] Assignee: Canon Kabushiki Kaisha, Tokyo, Japan

[21] Appl. No.: 828,577

[22] Filed: Feb. 10, 1986

Related U.S. Application Data

[63] Continuation of Ser. No. 659,719, Oct. 11, 1984, abandoned.

[30] Foreign Application Priority Data

Oct. 14, 1983 [JP] Japan .................. 58-193133

[51] Int. Cl.⁴ .......................................... G03B 17/18
[52] U.S. Cl. .................................. 354/471; 354/475
[58] Field of Search .............. 354/465, 471, 474, 475

[56] References Cited

U.S. PATENT DOCUMENTS 4,112,440  9/1978  Kanemara ..................... 354/474
4,261,659  4/1981  Shinoda et al. ................ 354/474

FOREIGN PATENT DOCUMENTS 0027370 11/1969 Japan .
0000553  1/1973 Japan .
0064426  6/1974 Japan .
0034532  4/1975 Japan .
0102719  8/1977 Japan .
0009690  3/1980 Japan .

Primary Examiner—Russell E. Adams
Attorney, Agent, or Firm—Toren, McGeady & Associates

[57] ABSTRACT

In a display device for a camera of the type having adjustable display brightness, photographic information to be displayed is repeatedly converted by an A-D operation which is performed by an A-D conversion circuit; the digitally converted information is displayed by a display device. Information concerning display brightness modulation required for the display is arranged to be converted by A-D operation by the A-D converter every time the photographic information to be displayed is converted by A-D operation a predetermined number of times. The display brightness is adjusted on the basis of the A-D converted value of the display brightness information.

13 Claims, 2 Drawing Figures

DISPLAY DEVICE FOR CAMERA

This is a continuation of application Ser. No. 659,719, filed Oct. 11, 1984, now abandoned.

BACKGROUND OF THE INVENTION

1. Field of the Invention

This invention relates to a display brightness modulating circuit for the display device of a photographic camera.

2. Description of the Prior Art

There is known a display device of the kind which performs A-D conversion on a display information signal supplied to an A-D converter. This device makes a digital display of the display information signal by supplying the A-D converted value thus obtained to a display circuit. Where a seven segment display arrangement formed with LED's or a plurality of light emitting elements such as LED's are employed in this type of conventional display device and where a display value scale mark is shown with the LED lit up at applicable points on a scale in a manner called a dot display, the display is sometimes affected by the brightness of ambient light and becomes barely observable if the display brightness is invariable. In view of this inconvenience, some display devices have been contrived that have adjustable light emission brightness of the display means based on according to the brightness of ambient light. Display devices of this type are shown, for example, in Japanese Laid-Open Patent Applications Nos. SHO 52-102719, SHO 50-34532 and SHO 49-64426; Japanese Utility Model Publication No. SHO 43-27370; and Japanese Patent Publication No. SHO 55-9690. When brightness modulation is carried out by these devices, a display is made on the basis of A-D converted brightness information. The display value itself represents a brightness value in most cases and brightness modulation can be accomplished by using the value of this A-D converted information.

However, when the display value is either not relative to brightness or a spot photometric value though it relates to brightness, the display light emission brightness cannot be adjusted to an apposite level by controlling the display brightness in the above manner on the basis of the A-D converted value indicates of a display value. To solve this problem, a photometric circuit obtains information on display brightness modulation required and adjusts the brightness of the light emitting element on the basis of a photometric output of this circuit in a manner, for example, disclosed in Japanese Utility Model Publication No. SHO 48-553.

However, in cases where the above display is to be made in a digital manner, it is preferable to employ a brightness modulating method in which the duty of display driving pulses is adjusted in a manner, for example, disclosed in the above Japanese Laid-Open Patent Application No. SHO 52-102719. This display brightness modulating method, however, necessitates A-D converting the output of the above photometric circuit and determining the duty of the display driving pulses on the basis of the A-D converted value thus obtained, as disclosed in the Japanese Laid-Open Patent Application No. SHO 52-102719.

Meanwhile, since the information to be displayed is A-D converted by an A-D converter as mentioned in the foregoing, the above method of A-D converting the brightness modulation information necessitates the use of two A-D converters.

The present invention is directed to the solution of the problem presented by the prior art device mentioned above. It is therefore a principal object of the invention to provide a simplified display device for a camera wherein the input of an A-D converter which is receiving the above display information is switched over from display information to a photometric output produced for display brightness modulation every time the display information is A-D converted a predetermined number of times, so that digital values representative of the display information and a digital value of the display brightness modulation information can both be obtained from a single A-D converter.

It is another object of the invention to provide a camera wherein, even when brightness information is locked by an EE (electric eye) locking operation during the above brightness modulation, the photometric output for display brightness modulation is not locked; and display brightness can be modulated even after the EE lock to ensure that the camera display is easily observable even in the event of an EE locking operation.

It is a further object of the invention to provide a camera wherein, when the input of the A-D converter is switched from one signal to another in the manner described in the foregoing, an A-D converting operation is not immediately performed on the input signal received by switching but is performed after the lapse of a predetermined period of time so that an accurate digital value can always be obtained for the signal received by switching.

These and further objects and features of the invention will become apparent from the following detailed description of the preferred embodiments taken in conjunction with the accompanying drawings.

SUMMARY OF THE INVENTION

To attain the first object of the invention, a display device which is arranged according to the invention repeatedly A-D converts display information input signals by an A-D converter and displays the information based on the A-D converted value thus obtained. The display device is provided with a brightness modulating circuit which includes a counter circuit which counts an A-D conversion completion signal produced from the A-D converter upon completion of every A-D conversion by the A-D converter; a switch-over signal forming circuit which forms a switch-over signal every time the counter circuit counts the A-D conversion completion signal a predetermined number of times; an input circuit which, in response to the switch-over signal, supplies a display brightness modulating photometric output to the A-D converter in place of the display information input signal; and a pulse forming circuit which produces pulses having a duty determined on the basis of the A-D converted value of the display brightness modulating photometric output and the light emitting element of the display device is driven with the pulses thus obtained.

DETAILED DESCRIPTION OF THE PREFERRED EMBODIMENTS

Figure 1:
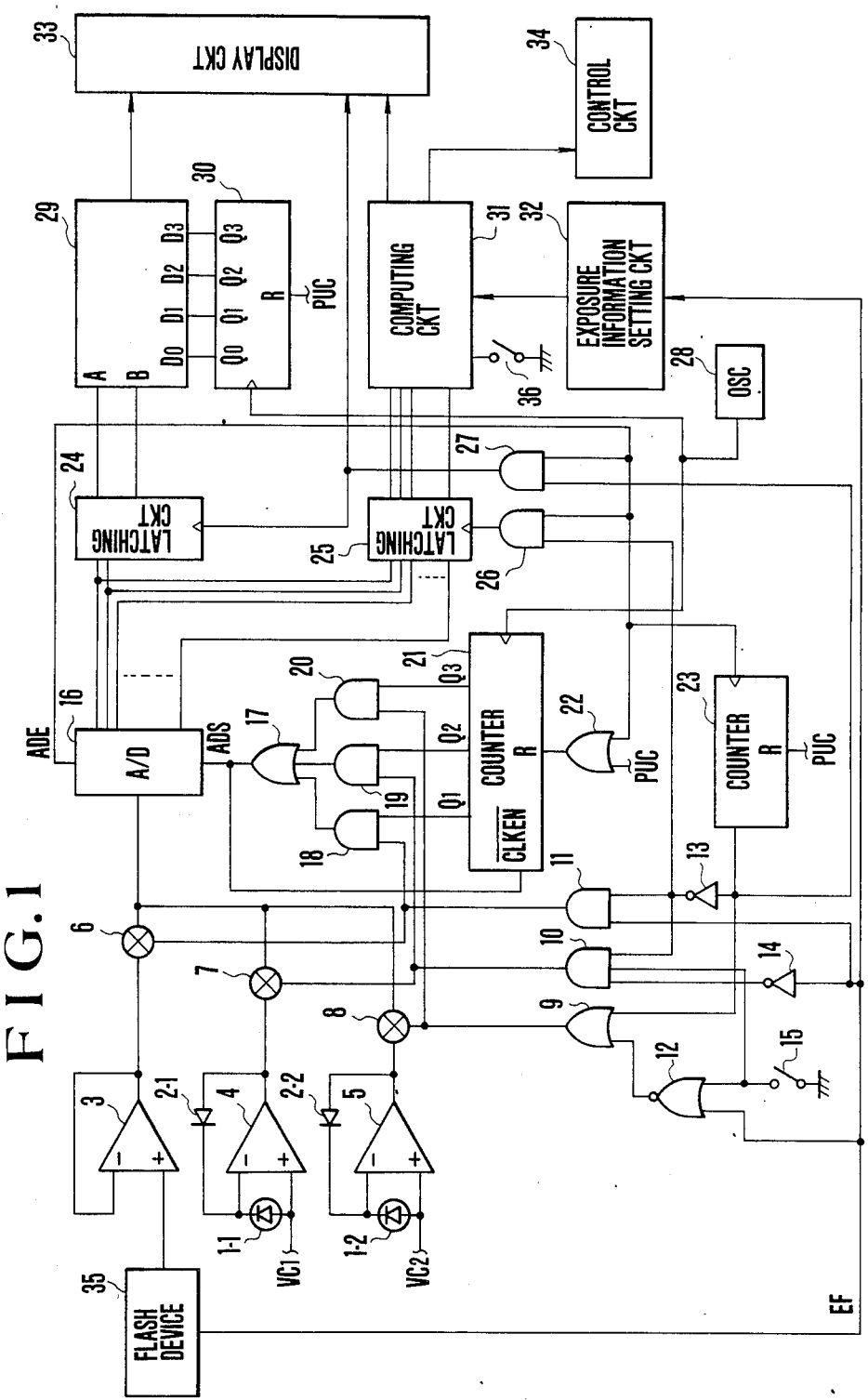
FIG. 1 is a circuit diagram showing a display device of a camera having a brightness modulating circuit to which the present invention is applied.

A brightness modulating circuit embodying the present invention is arranged as described below:

Referring to FIG. 1, a circuit diagram of a camera provided with the display brightness modulating circuit arranged according to the invention is shown. The camera includes a photo-sensitive element 1-1 for spot photometry or spot light measurement; a photosensitive element 1-2 for average light measurement; logarithmic diodes 2-1 and 2-2; and operational amplifiers 3, 4 and 5. A spot light measurement circuit for spot photometry is formed jointly by the photo-sensitive element 1-1, the diode 2-1 and the operational amplifier 4. An average light measurement circuit for averaging photometry is formed by the photo-sensitive element 1-2, the diode 2-2 and the operational amplifier 5. The operational amplifier 3 serves as a buffer amplifier which receives an aperture signal for flash light to be emitted from a flash device 35. A switch 15 effects switch-over between an average light measurement mode and a spot light measurement mode. An analog switch 7 or another analog switch 8 is selected through a selection circuit, which will be described later. Based on the position of this switch 15, either the output of the average light measurement circuit or that of the spot light measurement circuit is supplied to an A-D converter 16. There are provided a NOR gate 12, an OR gate 9, AND gates 10 and 11 and inverters 13 and 14, which form the above selection circuit. The selection circuit detects the position of the switch 15, an electric charge completion signal (hereinafter referred to as EF signal) coming from the flash device 35, and the output condition of a counter 23 and then selectively turns on one of the switches 6, 7 and 8 performing selective switching on an input signal supplied to the A-D converter 16. A counter 21 counts pulses produced from a clock pulse generator 28. The reset terminal of this counter 21 receives either a power-up-clear signal (hereinafter referred to as PUC signal) via an OR gate 22 or an A-D conversion completion signal (hereinafter referred to as ADE signal) produced from the A-D converter 16. Upon receipt of the ADE or PUC signal, the counter 21 begins to count. Each AND gate 18, 19 and 20 has one of its input terminals connected to one of the output terminals Q1, Q2 and Q3 of the counter 21 and the other input terminal is connected to one of the output terminals of the OR gate 9 and the AND gates 10 and 11 of the above selection circuit. When a high level signal is produced from the applicable output terminal Q1–Q3 of the counter 21, one of these AND gates 18–20 produces a high level signal as an A-D conversion start signal (hereinafter referred to as ADS signal) via the OR gate 17 causing the above A-D converter 16 to begin an A-D converting operation. The ADS signal is also supplied to a terminal $\overline{\text{CLKEN}}$ of the counter 21. The counting action of the counter 21 is in repose while the ADS signal is at a high level. An AND gate 26 supplies a latching signal to a latching circuit 25 in response to the above ADE signal while the output of the counter 23 is at a low level. The latching circuit 25 latches the output of the A-D converter 16 in response to the latching signal from the gate 26. An AND gate 27 supplies a latching signal to another latching circuit 24 in response to the ADE signal, while the output of the counter 23 is at a high level. The latching circuit 24 latches the output of the A-D converter 16 in response to the latching signal from the AND gate 27.

The above counter 23 counts the ADE signal and produces a high level output when the ADE signal is produced a predetermined number of times. The count of the counter 23 then returns to zero by the next count of the ADE signal. A multi-duty clock circuit 30 counts pulses produced from a pulse generator 28 and produces from its output terminals Q0–Q3 pulses of four different duties. This circuit 30 is arranged in the same manner as a circuit arrangement disclosed, for example, in Japanese Laid-Open Patent Application No. SHO 52-102719. A data selector 29 selects pulses produced from an applicable output terminal of the circuit 30 and supplies the selected pulses to a display circuit 33 for driving the display circuit 33 therewith. The greater the brightness is represented by the datum of the latching circuit 25, the greater the duty of the selected pulses will be.

An exposure information setting circuit 32 is provided for setting ASA or TV information or the like. A computing circuit 31 performs a computing operation on the set information and the datum of the latching circuit 25. The display circuit 33 latches the output of the computing circuit 31 with the output of the AND gate 27 and displays the latched information. The display circuit 33 makes a display by emitting a light from a light emitting element. A control circuit 34 performs exposure control on the basis of the output of the computing circuit 31. An EE lock switch 36 latches the output of the computing circuit 31 when the switch 36 turns on.

In this embodiment, the OR gate 9, the AND gates 10 and 11 and the inverter 13 jointly form a switch-over signal forming circuit. The multi-duty clock circuit 30 and the data selector 29 form a pulse forming circuit. The analog switch 8 forms an input circuit. The above display circuit 33 is either of the seven-segment display type consisting of light emitting elements like LED's or the type known as the dot display type having a plurality of LED's selectively lit to show applicable marks provided on a graduation plate. It is also possible to use a display circuit 33 which is composed of a liquid crystal display device and light emitting means and which has the liquid crystal display device illuminated by the light emitting means.

The embodiment of FIG. 1 operates as described below:

Spot photometry (or in the spot light measuring mode), the embodiment operates as follows: When a light measurement switch (not shown) is turned on, the PUC signal is produced from the power-up-clear circuit (not shown). By this signal, the counters 21 and 23 and the multi-duty clock circuit 30 are reset. The output level of the counter 23 then becomes low (hereinafter referred to as L). The output level of the inverter 13, therefore, becomes high (hereinafter referred to as H). Assuming that the flash device 35 is inoperative, the electric charge completion signal EF is at an L level. The output level of the inverter 14 becomes H. The light measurement switch-over switch 15 is off in the spot light measurement mode. The input of the NOR gate 12 and that of the AND gate 10 coming from the switch 15 are at an H level. Therefore, the output level of the AND gate 10 becomes H and the analog switch 7 turns on. Since the EF signal is at an L level and the light measurement switch-over switch 15 is off at this instant as mentioned above, the output level of the NOR gate 12 is L and the output of the counter 23 is also at an L level. Therefore, the output level of the OR gate 9 and that of the AND gate 11 become L. The analog switches 6 and 8 are off. Then, the output of the spot light measurement circuit, i.e. the output of the operational amplifier 4, is supplied to the A-D converter 16. Meanwhile, the outputs Q1, Q2 and Q3 of the counter 21 are at an L level immediately after the counter 21 is reset by the PUC signal. Therefore, the outputs of the AND gates 18, 19 and 20 are at an L level. The ADS signal, which is produced from the OR gate 17 as an A-D conversion start signal, is also at an L level. The operation of the A-D converter 16 is therefore in repose. After that, the counter 21 counts the pulses produced from the pulse generator 28. The level of the output Q1 of the counter 21 becomes H after the lapse of a period of time T1 from the count start. The AND gate 18, however, produces its output at an L level and the other input thereof is at an L level. The counter 21 further proceeds with counting and produces its outputs Q2 at an H level after the lapse of a further period of time T2. As a result, the AND gate 19 receives a high level input at one of its input terminals. Then, since the input of the other input terminal of the gate 19 is the high level output of the AND gate 10 as mentioned in the foregoing, the AND gate 19 produces an H level output when the level of the output Q2 of the counter 21 becomes H. This causes the output level of the OR gate 17 to become H. The H level output of the OR gate 17 results in an H level of the ADS signal which causes the A-D converter 16 to begin A-D conversion. The H level output of the OR gate 17 is also supplied to the terminal $\overline{\text{CLKEN}}$ of the counter 21 stopping the counting action of the counter 21. Therefore, the output Q2 of the counter 21 is kept at the H level.

As mentioned in the foregoing, the A-D converter 16 has the output of the spot light measurement circuit supplied thereto via the switch 7. Therefore, the A-D converting operation of the A-D converter 16 is performed on the output of the spot light measurement circuit. Upon completion of the A-D converting operation, the A-D converter 16 produces the ADE signal (conversion completion signal) at an H level. The ADE signal is supplied to the AND gates 26 and 27. At this instant, since the output level of the inverter 13 is H as mentioned in the foregoing, the output level of the AND gate 26 becomes H and the output of the A-D converter 16 is stored at the latching circuit 25. The computing circuit 31 receives the output of the latching circuit 25, the ASA or TV information set at the exposure information setting circuit 32, a lens full-open F-number (a maximum aperture value), etc. and performs a computation for display and exposure control. The result of computation thus obtained is supplied to the display circuit 34 and the control circuit 35.

Furthermore, when the H level ADE signal is produced upon completion of A-D conversion, as mentioned above, the counter 23 performs a count up action in response to the ADE signal. Furthermore, the ADE signal raises the input of the OR gate 22 to an H level. The output level of the OR gate 22 becomes H resetting the counter 21. The level of the outputs Q1, Q2 and Q3 of the counter 21 then becomes L. Accordingly, the level of the ADS signal becomes L. The levels of the above ADE signal becomes L immediately after it becomes H. Therefore, the counter 21 is released immediately after it is reset. Then, since the level of the ADS signal becomes L as mentioned above, the counter 21 becomes operative and resumes its counting action. Then, after the lapse of the periods of time T1 and T2, the level of the output Q2 of the counter 21 becomes H. The level of the ADS signal becomes H and again the A-D converter 16 begins to perform A-D conversion. The A-D converting action is thus repeatedly performed. An A-D converted value is transferred to the latching circuit 25 at every A-D conversion. Assuming that the counter 23 counts the ADE signal every time the A-D converting action comes to an end, when the A-D conversion has been performed n times, say, five times, the counter 23 counts the ADE signal five times. Then, the counter 23 produces an H level output from its output terminal. This H level output causes the output level of the OR gate 9 to become H and that of the inverter to become L. The output level of the AND gate 10 thus becomes L. Accordingly, the analog switch 7 turns off and the analog switch 8 on. With the analog switch 8 turning on, the output of the amplifier 5, which is provided for average light measurement, is supplied to the A-D converter 16.

Meanwhile, since the output level of the AND gate 10 and 11 is L, that of the AND gates 18 and 19 also becomes L. Furthermore, since the output level of the OR gate 9 is H, the AND gate 20 reaches a selective condition. Therefore, after the end of the fifth A-D conversion, the ADS signal is not produced even after the lapse of the above periods of time T1 and T2 from resumption of the counting action of the counter 21. Then, when the level of the output Q3 of the counter 21 becomes H after the lapse of a further period of time T3, the output level of the AND gate 20 becomes H causing the output level of the OR gate 17, i.e. the ADS signal, to become H. This in turn causes the A-D converter 16 to begin A-D conversion. At this instant, since the output of the average light measurement circuit has been supplied to the A-D converter 16 as mentioned above, the A-D converting operation is performed on the result of average light measurement. When the level of the ADE signal becomes H after the end of A-D conversion, the output level of the AND gate 27 becomes H when the output of the counter 23 is at an H level. As a result a signal representing two higher place bits of the A-D converted value is stored at the latching circuit 24. The H level output of the AND gate 27 is also supplied to the display circuit 33. When this signal changes from an L level to the H level, a computed display value produced from the computing circuit 31 is latched at the display circuit 33. In other words, the display circuit 33 latches a computed value obtained on the basis of an A-D converted value obtained by the fifth A-D conversion and displays the latched information thus obtained. Furthermore, the output of the latching circuit 24 is also supplied to the data selector 29. The selector 29 then selects an applicable duty from the clock pulses of four different duties based on the output of the latching circuit 24 supplied thereto and then supplies the pulses thus selected to the display circuit 33 as a brightness modulating signal.

The multi-duty clock circuit 30 produces the above four different duty signals. The duty pulses corresponding to the average light measurement output latched at the latching circuit 24 are selected from the circuit 30. With the selected pulses supplied to the display circuit 33, the light emission brightness from the display circuit 33 is thus controlled by the average light measurement output. With the sixth A-D conversion coming to an end, that is, upon completion of A-D conversion for brightness modulation, when the ADE signal produced is counted by the counter 23, the content of the counter 23 resets, i.e. becomes zero. The output level of the counter 23 thus becomes L. Therefore, the output level of the OR gate 9 becomes L and that of the inverter 13 becomes H. The output level of the AND gate 10, therefore, again becomes H. The analog switch 7 turns on and the analog switch 8 off. As a result, the output of the operational amplifier 4, which produces a signal representative of the result of spot light measurement, is again supplied to the A-D converter 16. Accordingly, a seventh A-D conversion is again carried out on the spot light measurement output.

Following this, the spot light measurement output is thus repeatedly A-D converted in the same manner as described in the foregoing. Then, a computed value obtained on the basis of an A-D converted value obtained by a fifth A-D conversion is latched and displayed at the display circuit 33 upon completion of a sixth A-D conversion. In the case of the sixth A-D conversion, an average light measurement output is A-D converted and latched at the latching circuit 24. Then, the duty pulses suited for driving the display circuit 33 are selected on the basis of the average light measurement output, which is latched at the latching circuit 24. In other words, the display circuit 33 makes a display of a datum based on a result of spot light measurement while light emission brightness for the display is determined on the basis of the result of average light measurement. This arrangement gives an easily observable display within a view finder.

In the event of average photometry (or the average light measurement mode), the embodiment operates as follows: In this event, the light measurement switchover switch 15 is turned on. With the switch 15 turned on, the input and output levels of the AND gate 10 become L. Since the level of the EF signal is also L, the output level of the NOR gate 12 becomes H and that of the OR gate 9 also becomes H. Therefore, the analog switch 8 turns on and the analog switches 6 and 7 turn off. This causes the operational amplifier 5, which produces an average light measurement signal, to supply it to the A-D converter 16. Then, the output of the average light measurement circuit is repeatedly A-D converted. When the A-D converting operation is thus continuously repeated five times on the output of the average light measurement circuit, the output level of the counter 23 becomes H. However, since the switch 15 has already been turned on in the average light measurement mode, the OR gate 9 is always producing an H level output to keep the switch 8 closed. In this mode, therefore, it is always the output of the average light measurement circuit that is A-D converted. Furthermore, even in this mode, the ADE signal produced upon completion of the sixth performance of A-D conversion causes the latching circuit 24 to latch a digital value obtained by the sixth A-D conversion and, at the same time, also causes the display circuit 33 to latch there a computed value computed on the basis of the datum which is obtained by the fifth A-D conversion and has been latched at the latching circuit 24 in the same manner as in the spot light measurement mode. In the average light measurement mode, duty pulses suited for driving the display circuit 33 are selected on the basis of the output of average light measurement and the display circuit 33 displays the average light measurement output.

Next, in the event of a so-called EE lock operation either in the above average light measurement mode or in the spot light measurement mode, the embodiment operates as follows: The switch 36 is turned on by the operation of an EE lock operation member. With the switch 36 turned on, the output value of the computing circuit 31 is locked. After that, the display value is unchanged by variation in brightness. However, the A-D converting operation is even performed with the switch 36 turned on. Therefore, since the latching circuit 24 is receiving the A-D conversion output at a rate of one in six A-D conversions as mentioned in the foregoing, pulses of the display circuit driving duty are selected based on the variations in the brightness of the object to be photographed. Such being the arrangement, the display brightness modulating operation can be accomplished despite the EE lock operation.

In the event of a flash photographing mode, the embodiment operates as follows: In this event, the main capacitor of the flash device 35 is charged by switching on the power supply for the flash device 35. When the main capacitor is fully charged, a charging completion signal EF is produced at an H level. This H level signal reaches the NOR gate 12 and the inverter 14. The output level of the NOR gate 12 and that of the inverter 14 become L. Meanwhile, the output level of the counter 23 is L before A-D conversion is performed five times as mentioned in the foregoing. Therefore, the output of the inverter 13 is at an H level. As a result, the output level of the AND gate 11 becomes H and the output levels of the OR gate 9 and the AND gate 10 L. This turns on the analog switch 6 and turns off the analog switches 7 and 8. Therefore, an aperture signal produced from the flash device 35 is supplied to the A-D converter 16 via the buffer of the operational amplifier 3. Since the above H level output of the AND gate 11 has been supplied to one of the input terminals of the AND gate 18, the output level of the AND gate 18, i.e. the ADS signal, becomes H in response to the output Q1 produced at an H level from the counter 21 after the lapse of a period of time T1 since counting by the counter 21 started. This causes the A-D converter 16 to begin to perform A-D conversion. After that, the embodiment operates in the same manner as in the spot light measurement mode. When the A-D converting operation is repeatedly performed five times on the aperture signal for flash photography, which is produced from the amplifier 3, the switch 6 is turned off. In place of the switch 6, the switch 8 is turned on, supplying the output of the average light measurement circuit to the A-D converter 16. Then, A-D conversion is performed once on the average light measurement output and a datum for display brightness modulation is latched at the latching circuit 24. Therefore, even in the flash photographing mode, display light emission brightness is adjusted based on the average light measurement output while an aperture value for the flash light is displayed. Furthermore, in the flash photography mode, the EF signal is supplied to the exposure information setting circuit 32. The shutter time of the camera is thus automatically set at a value suited for the flash photography mode in response to the EF signal.

In the operation described in the foregoing, at the time of switch-over to the A-D converting operation on the average light measurement output from the A-D converting operation on the spot light measuremet output or on the flash photography aperture signal, the time interval between completion of A-D conversion and the issue or delivery of the ADS signal from the OR gate 17 is longer than the interval between completion of each performance of the repeating A-D converting operation on the spot light measurement output or on the flsh photographing aperture signal and issue of the ADS signal. In shifting the input circuit for the A-D converter 16, therefore, commencement of the A-D converting operation can be effectively prevented by virtue of this arrangement until the input signal to be supplied to the A-D converter 16 has a stable value. This arrangement always ensures the accuracy of an A-D converted value for input information. Furthermore, at the time of switch-over from the A-D converting operation on the average light measurement output to the A-D converting operation on the spot light measurement output or the flash photographing aperture signal, the time interval between the end of A-D conversion and issue of the ADS signal is short. However, since the datum obtained by the fifth performance of A-D conversion is employed as display information to be supplied to the display circuit 33 as mentioned in the foregoing, no problem arises even if the input signal to be supplied to the A-D converter 16 at the time of this input switch-over is unstable, because an A-D converted value obtained at this point of time is supplied solely to the latching circuit 25 and not to the display circuit 33. Besides, the arrangement to shorten the A-D conversion period serves to quicken the formation of a display value.

Figure 2:
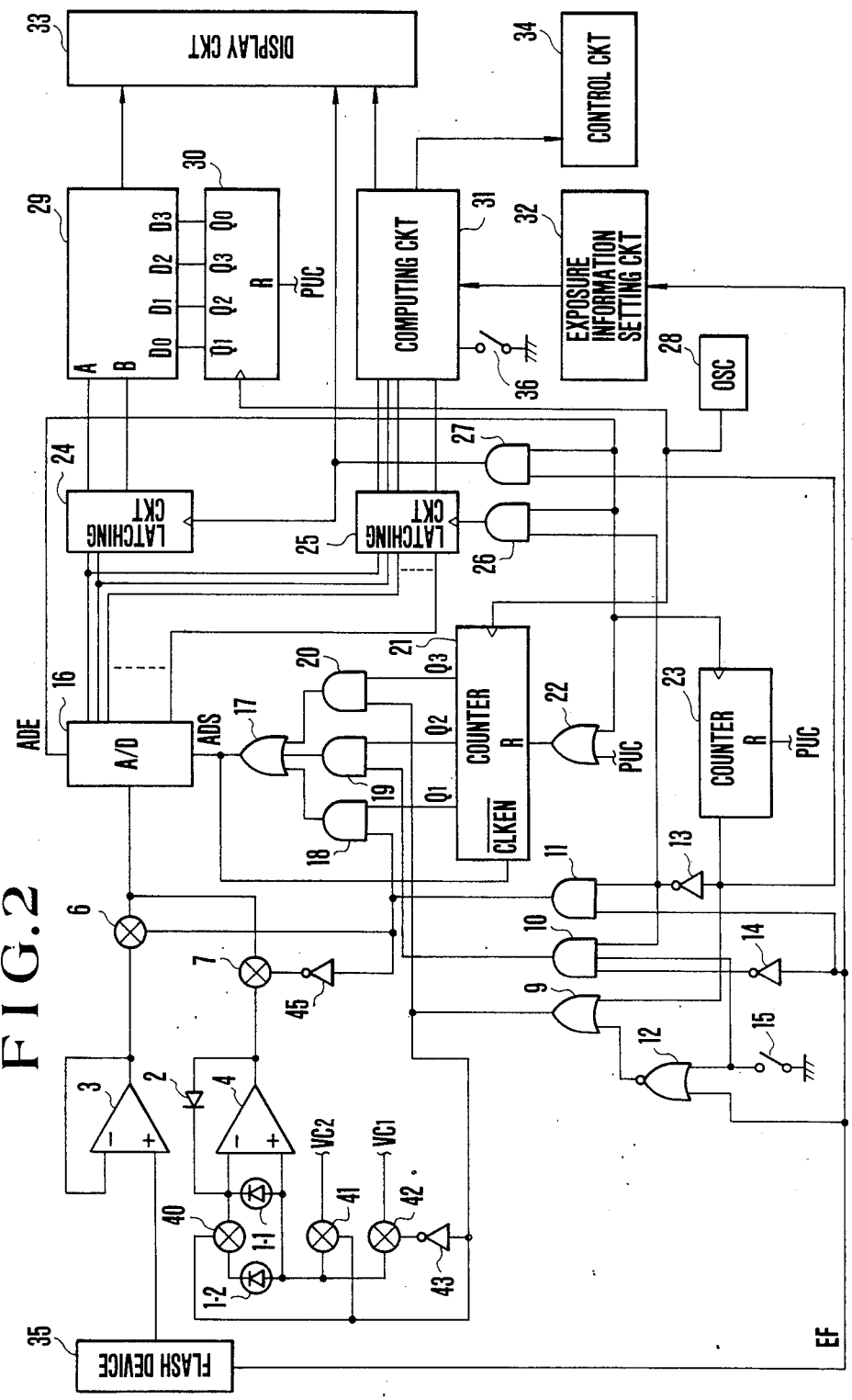
FIG. 2 is a circuit diagram showing another embodiment of the invention.

FIG. 2 shows a circuit diagram of another embodiment of this invention. In FIG. 2, the same component parts as those of the embodiment of FIG. 1 are identified by the same reference numerals and symbols. The difference between this embodiment and the embodiment of FIG. 1 is as follows: In this case, when the output level of the OR gate 9 is L, analog switches 40 and 41 are turned off and the output level of an inverter 43 becomes H turning on another analog switch 42. With the analog switch 42 turned on, the photosensitive element 1-1, which is provided for spot light measurement, is alone connected to the amplifier 4 to use the amplifier 4 as a light measurement circuit for spot light measurement. When the output level of the OR gate 9 is H, the analog switch 42 is turned off while the analog switches 40 and 41 are turned on, connecting the photosensitive element 1-1 and 1-2 for spot light measurement and average light measurement to the amplifier 4 in such a manner that the amplifier 4 can be used as a light measurement circuit for average light measurement. The embodiment operates in about the same manner as the embodiment of FIG. 1 and, therefore, requires no further description.

In accordance with this invention, as described in the foregoing, the output of the light measurement circuit which is provided for the purpose of modulating the display brightness is supplied to the A-D converter 16, which repeatedly A-D converts display information, every time the A-D converter 16 has repeatedly A-D converted the display information a predetermined number of times. Therefore, information required for display brightness modulation can be A-D converted by the same A-D converter 16 that performs the A-D converting operation on the display information. Then, the brightness of light emission from the display device 33 is adjusted according to a digital value determined on the basis of the brightness modulating information. Such being the invented arrangement, the brightness modulating circuit can be simplified because brightness modulating information can be accurately converted into a digital value without recourse to any additional circuit for the purpose of modulating display brightness.

What is claimed is:

1. A camera which is arranged to A-D convert photographic information by an A-D conversion circuit and to display the information by display means on the basis of a digital value obtained through an A-D converting operation of said A-D conversion circuit, comprising:
   (a) an input circuit arranged to supply to said A-D conversion circuit, in place of said photographic information, a brightness modulating datum required for determining a display brightness of display information to be displayed by said display means, said circuit supplying alternatively said photographic information and said modulating datum, with a predetermined timing, to said A-D conversion circuit; and
   (b) an adjustment circuit which adjusts said display brightness of display information displayed by said display means on the basis of said A-D converted modulating datum.

2. A camera which is arranged to A-D convert photographic information repeatedly by an A-D conversion circuit and to display the information by display means on the basis of a digital value obtained through the A-D converting operation of said A-D conversion circuit, comprising:
   (a) an input circuit which supplies to said A-D conversion circuit, in place of said photographic information, a brightness modulating datum required for determining a display brightness of display information to be displayed by said display means, said brightness modulating datum being supplied to said A-D conversion circuit every time said A-D converting operation is performed a plural number of times on said photographic information; and
   (b) an adjustment circuit which adjusts said display brightness of display information displayed by said display means on the basis of said A-D converted modulating datum.

3. A camera according to claim 1 or 2, further comprising a control circuit for delaying an A-D conversion operation of said A-D conversion circuit by a prescribed time when the brightness modulating datum is supplied to said A-D conversion circuit in place of the photographic information by said input circuit.

4. A camera which is arranged to A-D convert photographic information repeatedly by an A-D conversion circuit and to display the information by display means on the basis of a digital value obtained through the A-D converting operation of said A-D conversion circuit, comprising:
   (a) an input circuit which supplies to said A-D conversion circuit, in place of said photographic information, a brightness modulating datum required for determining the display brightness of display information to be displayed by said display means, said brightness modulating datum being arranged to be supplied to said A-D conversion circuit every time said A-D converting operation is repeatedly performed a plural number of times on said photographic information;
   (b) latching means for latching the brightness modulating datum A-D converted by said A-D conversion circuit every time said datum is A-D converted; and (c) an adjustment circuit arranged to adjust said display brightness of said display means by means of pulses of duty selected on the basis of said datum latched by said latching means.

5. A camera according to claim 1, 2 or 4, wherein said brightness modulating datum is a light measurement output.

6. A camera according to claim 5, wherein said light measurement output is an average light measurement output.

7. A camera comprising:
(a) a light measurement circuit having first and second light measurement modes;
(b) an A-D conversion circuit arranged to repeatedly A-D convert a signal based on the output of said light measurement circuit;
(c) switch-over means for switching said first light measurement mode to said second light measurement mode;
(d) a delay circuit which causes said A-D converting operation on the signal based on the output of said light measurement circuit which is produced in said second light measurement mode to be performed a predetermined constant period of time after the switching action of said switch-over means; A-D converting operation; and
(e) a display circuit arranged to display a datum corresponding to the A-D converted value obtained from said A-D conversion circuit.

8. A camera having an A-D conversion circuit for repeatedly converting a signal corresponding to the output of a light metering circuit to a digital value, and a display circuit for displaying information based on the A-D converted value, comprising:
(a) a detecting circuit for detecting an A-D converted value every time said A-D conversions are made by said A-D conversion circuit for a plurality of times; and
(b) an adjusting circuit for adjusting a display state displayed by said display circuit based on the A-D converted value detected by said detecting circuit, whereby the brightness of the display state is retained without change until the A-D conversions are made for a plurality of times even if the value of every A-D conversion made takes a different value.

9. A camera having an A-D conversion circuit for A-D converting an output of a light measuring circuit, and a display circuit for making a display on the basis of information of N bits out of digital values A-D converted by said A-D conversion circuit, comprising:
(a) an adjustment circuit for adjusting a brightness of a display state displayed by said display circuit on the basis of information of M (N>M) bits out of said A-D converted digital values.

10. A camera according to claim 9, further comprising a circuit for adjusting the brilliance of the displayed information by said display circuit on the basis of digital information of a prescribed number of bits counting from the most significant bit of the N-bit digital value of said A-D conversion circuit regardless of the lower bits of the digital information.

11. A camera comprising:
(a) a light metering circuit;
(b) a display circuit for displaying information based on the output of said light metering circuit;
(c) a circuit for adjusting the brilliance of the displayed information in accordance with the output of said light metering circuit;
(d) an EE lock actuator member;
(e) a control circuit for prohibiting the output of said light metering circuit from being transmitted to said display circuit without hindering transmission of the output of said light metering circuit to said adjusting circuit when said EE lock actuator member is operated.

12. A camera comprising:
(a) a light metering circuit for producing an output signal corresponding to a brightness of an object to be photographed;
(b) a photographic information signal forming circuit;
(c) an A-D conversion circuit for recyclic A-D conversion of an input signal thereto;
(d) change-over means for changing over between connections of outputs of said light metering circuit and said signal forming circuit to an input of said A-D conversion circuit;
(e) a delay circuit responsive to change of the input of said A-D conversion circuit by said change-over means for delaying initiation of an A-D converting operation by said A-D conversion circuit of the changed input signal thereto for a prescribed time in synchronism with the changing operation; and
(f) a display circuit for displaying data based on the A-D converted value of said A-D conversion circuit.

13. A camera which is arranged to A-D convert photographic information by an A-D conversion circuit, and having a control circuit for controlling an exposure on the basis of said A-D converted photographic information and display means for displaying a data, comprising:
(a) an input circuit arranged to supply to said A-D conversion circuit, in place of said photographic information, a brightness modulating datum required for determining a display brightness of display information displayed by said display means, said circuit applying said photographic information and said modulating datum alternatively to said A-D conversion circuit as the changing over is effected by a predetermined time interval; and
(b) an adjustment circuit which adjusts said display brightness of display information displayed by said display means on the basis of said A-D converted modulating datum.

* * * * *